United States Patent [19]

Walker

[11] 4,033,325

[45] July 5, 1977

[54] FLUID SHEET SOLAR COLLECTOR

[76] Inventor: James Edwin Walker, Rte. 5, Box 150, Charlottesville, Va. 22901

[22] Filed: May 11, 1976

[21] Appl. No.: 685,258

[52] U.S. Cl. .............................................. 126/271
[51] Int. Cl.² ........................................... F24J 3/02
[58] Field of Search ............................. 126/270, 271

[56] References Cited

UNITED STATES PATENTS

| | | | |
|---|---|---|---|
| 1,250,260 | 12/1917 | Wilcox | 126/271 |
| 2,311,579 | 2/1943 | Scott | 126/271 |
| 2,705,948 | 4/1955 | Rostock | 126/271 |
| 2,783,682 | 3/1957 | Swenson | 126/271 |
| 3,215,134 | 11/1965 | Thomason | 126/271 |
| 3,236,294 | 2/1966 | Thomason | 126/271 |
| 3,387,602 | 6/1968 | Thomason | 126/271 |
| 3,886,998 | 6/1975 | Rowekamp | 126/271 |
| 3,972,317 | 8/1976 | Gallagher | 126/271 |

*Primary Examiner*—Lloyd L. King
*Attorney, Agent, or Firm*—Sixbey, Bradford & Carlson

[57] ABSTRACT

This fluid sheet solar collector is devised as an assembly to produce a sealed unit which contains an internal collector fluid circulating through a closed loop to pass in a thin sheet over a solar energy absorber surface and to pass in good thermal contact through a self contained heat exchanger to effect a net solar energy derived heat transfer to external devices. The internal collector fluid flows upward in a thin sheet contained between a semi-rigid transparent cover and a solar absorber surface wherein the fluid is heated; flows downward through a heat exchanger wherein the heat is transferred; the net effect is to maintain a thermo-kinetic circulation of the fluid with neither fluid conduits nor high thermal conductivity materials required in the heating portion of the assembly.

8 Claims, 3 Drawing Figures

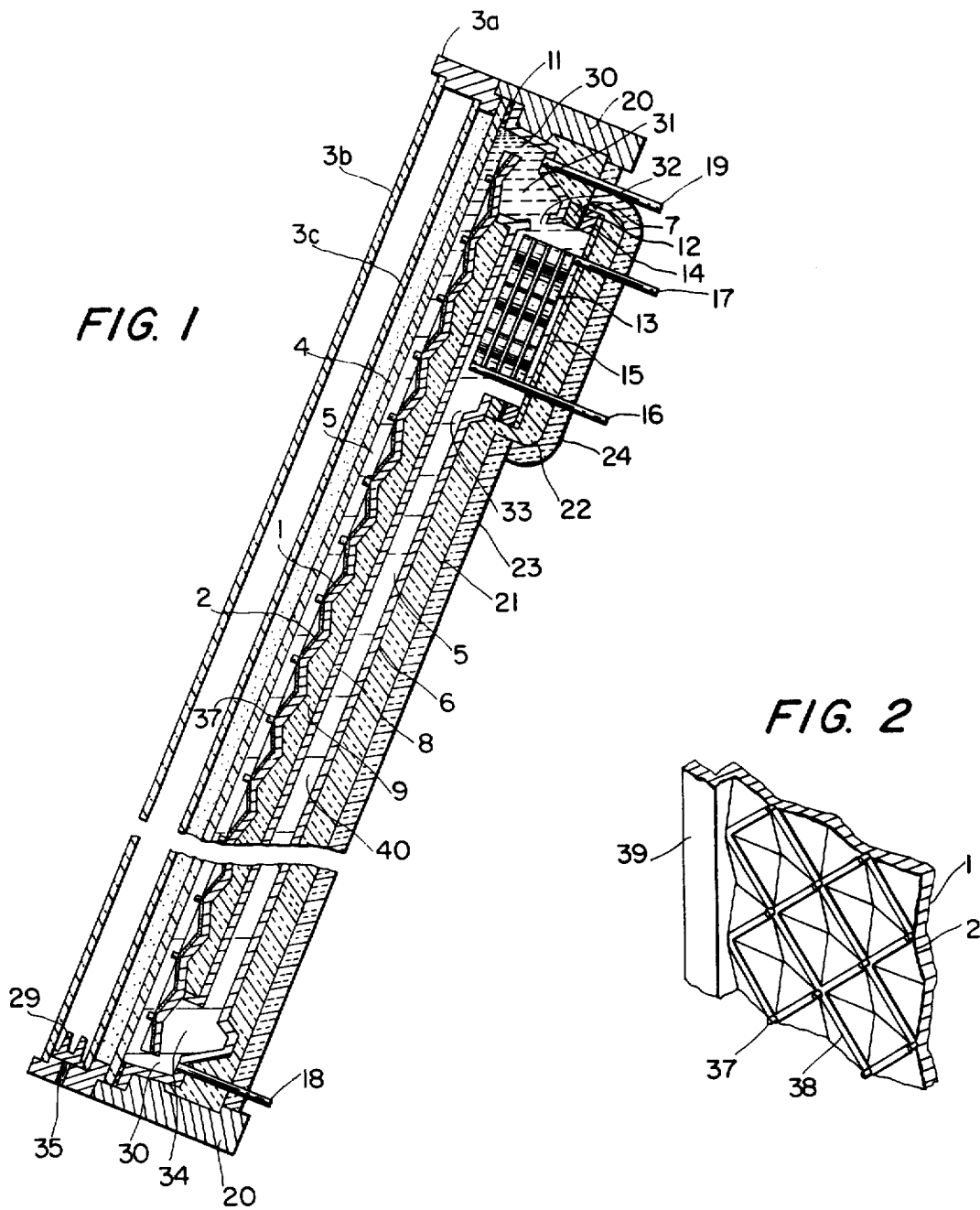

FLUID SHEET SOLAR COLLECTOR

SUMMARY OF THE INVENTION

This invention relates in general to solar radiation collectors of the flat plate type typically used for the heating of water, air, and other fluids. The invention relates in particular to improvements in flat plate type solar collectors with regard to: the method of solar heat collection, the utilization of moderate and low thermal conductivity materials, the adaptability to various means of plastics processing, the convenience in installation to conventional structures and fluid systems.

The principle objective of the invention is to produce an improvement in flat plate type solar heating devices by utilizing a circulating collector fluid to flow over the entire surface of a solar radiation absorber and, in transit, to efficiently extract heat where produced and to transport the extracted heat to an intimately associated heat exchanger for transfer to external devices as are used in the practical heating of water, air, and other fluids. This objective is further directed to the other production of a solar energy collector which is: isolated from chemical attack by external fluids, non-reliant on the use of high thermal conductivity materials in the solar absorber or other structure, non-reliant on the use of tubing and conduits to route fluid in thermal contact with the solar absorber, and convenient for handling and attachment in a practical installation.

Flat plate type solar collectors have been used productively for many years for the heating of fluids, usually water or air, brought into thermal contact with a good solar energy absorber. The great majority of these solar collectors utilize a blackened metal-copper, aluminum, or steel as the solar absorber and utilize flow conduits to circulate a heat extraction fluid in good thermal contact with the absorber. Difficulties are acknowledged with these metal sheet and conduit type solar collectors where domestic tap water is utilized for the heat extraction fluid; substances carried in the water can deposit onto the metal to reduce the heat transfer capability; other substances can chemically attack the metal with the result of corrosive failure. Steps proposed to reduce these difficulties can be both costly and inconvenient to the owner of the solar collector. Many domestic water systems use copper as the plumbing material because of its lesser susceptability to deposits and chemical attack. It is however, relatively more costly than aluminum or steel and is still subject to attack at the elevated temperatures typical to solar collectors. An improved method for solar energy collection is achieved by eliminating the requirement for the high thermal conductivity materials in the solar absorber and by passing any potentially destructive fluids through a separate heat exchanger which can be made replaceable and can be operated at improved thermal efficiency.

Disclosures of solar collectors using liquids routed through the collector by means other than metal tubes often do not describe the structural requirements of the liquid containment means although substantial stresses can be involved. Any such collector inclined above the horizontal is subject to the pressure head of the liquid over the vertical height of the liquid containment and may be subject to additional pumping pressures. In practice, the vertical height of the fluid may be in the range of 3 feet to 8 feet; corresponding pressures at the bottom of the containment may be in the range of 1.3 to 3.5 pounds per square inch. Although seemingly small, it should be recognized that to maintain a realistic 4000 psi (pounds per square inch) tensile stress in a 3/16 inch thick cover material containing a 3 foot high liquid filling, adequate supports are required at not more than 8½ inch intervals. This invention provides an improved method for constructing a liquid filled solar collector wherein a subatmospheric pressure is internally imposed on the liquid to cause external atmospheric pressure acting on the cover material to squeeze the liquid into a sheet of a thickness determined by an internal configuration of spacers; such spacers act to support the cover at regular intervals to provide reduction in cover material stress and to facilitate the use of thinner materials.

It is another objective of this invention to produce a configuration for the solar heating of a liquid maintained in a thin sheet between a cover material and an internal surface by virtue of higher external pressure; i.e. reduced internal pressure, acting through the cover material to squeeze the liquid. The internal surface is effectively rigid and the cover material, or combination of materials, may be semi-rigid or flexible and may be stressed in tension. The cover materials may function as the solar absorber or may be solar transparent wherein the internal surface or the fluid constitutents may function as the solar absorber. The internal surface may be configured to provide cover spacers, fluid flow diverters, and other functions.

It is another objective of this invention to produce a configuration for the solar heating of a fluid — liquid or gas — flowing in a continuous and closed loop of which one portion is a sheet like upward flow in contact with a solar absorber surface and the remainder of the loop is any reasonable closed configuration by which all fluid in the upward sheet flow is collected at the top and is provided passageway downward for disbursement along the bottom of the continuous fluid sheet. The upward flow portion is physically separated from the downward flow portion and is thermally insulated to reduce undesirable heat transfer through the physical separator. The upward flow portion of the configuration receives incident solar energy illumination which is transformed to heating of the fluid in that portion; the downward portion does not. Consequently, thermodynamic equilibrium establishes a net higher temperature in the upward portion and a corresponding net greater density in the downward flow portion. The result is to establish and to maintain a fluid flow in the closed loop. Flat plate type solar collectors are generally installed in some inclined position to the horizontal. Upward in the context of this invention is that direction toward the topmost part of the configuration. The configuration is considered to operate as described at angles from the horizontal in the range of 20° to 90°.

It is yet another objective of this invention to produce a configuration for practical heat extraction from a solar collector. Such heat extraction is imposed in the downward flow portion of the closed loop wherein fluid is directed through a heat exchanger to accomplish heat transfer from the collector fluid to an external fluid which is presumed to be part of a practical heating arrangement. The heat exchanger need be integral in the closed loop configuration and must provide physical separation between the two fluids. It must also be in close thermal proximity to the top of the circulating fluid sheet. Otherwise, physical design of the heat exchanger will vary according to the thermal properties of the two fluids and the expected heat transfer efficiency. One representative cross flow type heat exchanger is derived for liquid-to-liquid heat transfer. Liquid-to-gas and gas-to-gas heat transfer are practical embodiments of this invention; each unique fluid pair can result in one or more heat exchanger configurations.

It is yet another objective of this invention to provide a solar collector configuration which is ameanable to fabrication by molding and other processes typical to plastics manufacturing. Any fabrication process may be considered with due attention to size, structural requirement, thermal requirement, and desired economy of the manufactured part. It is considered that plastic resins in combination with reinforcements, fillers, and other additives are materials consistent with this objective. It is also considered that formed plastics, including structural foams, are consistent with this objective wherein they satisfy a desired structural and thermal property of the solar collector configuration.

It is still another objective of this invention to provide a configuration of size, weight, and physical arrangement for a solar collector which results in improved facility of installation and maintenance of the solar collector. The collector is designed to provide convenience of mounting in conventional spacings in residential framing, to provide for accessability to the heat exchanger in the event of replacement, and to provide for conventional attachment to external fluid devices.

The foregoing and other objects of this invention will be more clearly evident from a consideration of the following specification and claims taken in conjunction with the accompanying drawings in which:

FIG. 1 is a view in cross section of a preferred embodiment of the solar collector assembly of the present invention;

FIG. 2 is an isometric view of a portion of the internal surface containing the solar absorber for the solar collector assembly of FIG. 1.

Figure 3:
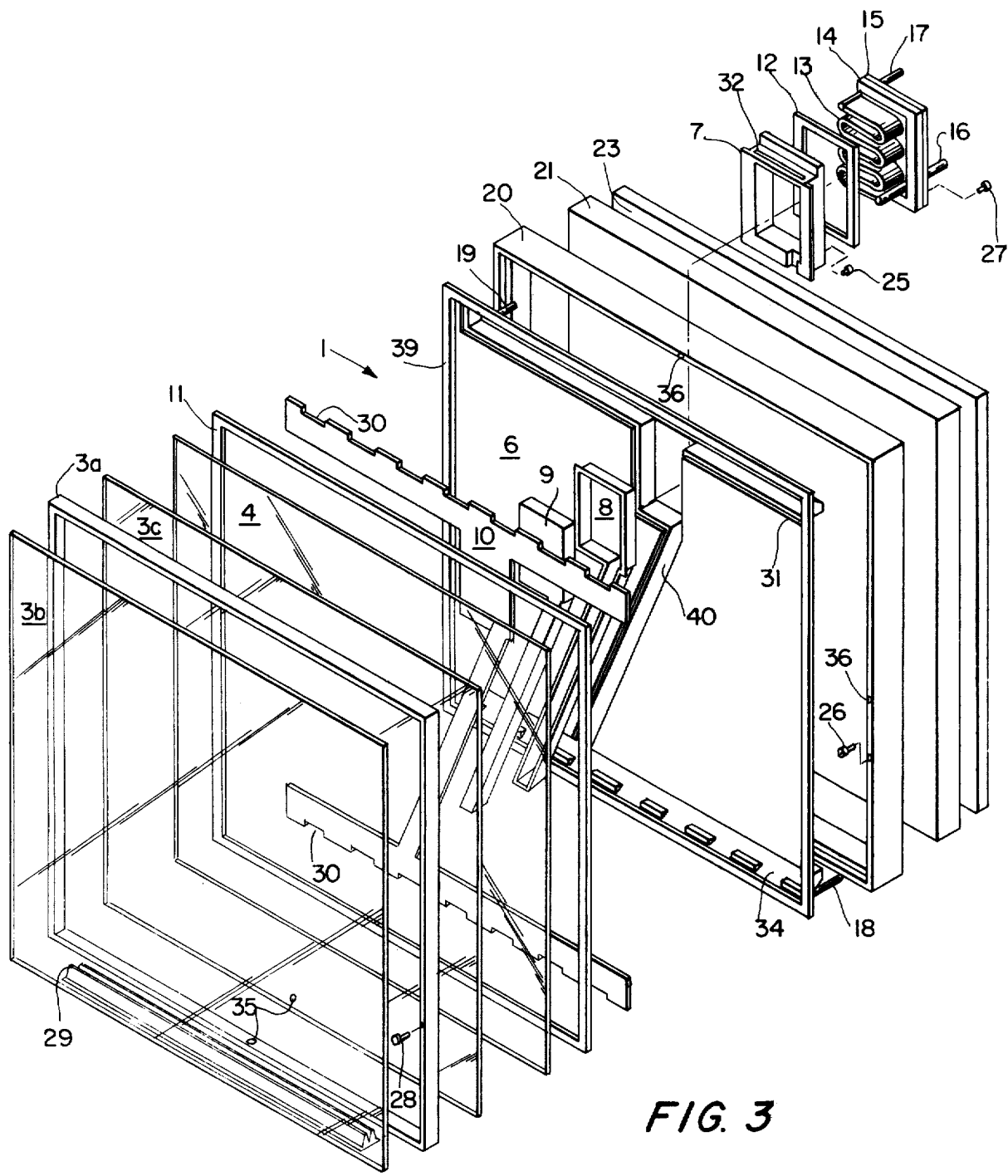
FIG. 3 is an isometric exploded view of the solar collector assembly of FIG. 1 showing the physical relationships of the various component parts thereof.

With reference to FIG. 1, an interior face pan 1 extends the entire height and width of the solar collector and is front surfaced by a solar radiation absorber 2 which transforms incident solar illumination into usable heat. The incident illumination is that solar radiation transmitted through a solar transparent or translucent window assembly 3 and face cover 4 and subsequently through the collector fluid 5. The window assembly 3 may be a single pane 3b or may be a multiplicity of panes 3b, 3c according to conventional practices for control of thermal losses from solar collectors. Vent 35 is provided in a window frame 3a for the window assembly 3 to assure the presence of atmospheric pressure on both sides of the panes of the window assembly and on the frontface of the face cover 4. It is considered in this invention that the enclosure formed by window assembly 3 and face cover 4 may be filled with a gas other than air such as carbon dioxide or sulfur dioxide to attain a lower thermal conductivity material in the enclosure. In such case, a pressure equalization membrane 29 is sealed along the inner bottom edge of window frame 3a and over the vent 35 to assure atmospheric pressure equalization in the enclosure.

With reference to FIG. 1 and FIG. 3, assembly components consisting of the face cover 4, a collector pan 6, a heat exchanger mount 7, a heat exchanger frame 14, and a heat exchanger cover 15 form an enclosure. This enclosure is hermetically sealed from the environment by a face gasket 11 and by heat exchanger gasket 12. The heat exchanger mount 7 is made an inseparable and hermetically sealed assembly with the collector pan 6 as part of its fabrication. An interior structure is formed within the enclosure, as will be subsequently explained, to produce a loopwise continuity of open space. Such interior structure is formed by the face pan 1, a downcomer insert 8, and downcomer insulation 9. The loopwise continuity is subsequently filled in its entirety with collector fluid 5.

A heat exchanger tube or bundle 13 is suspended in the loopwise continuity by virtue of attachment to the heat exchanger cover 15 which is attached through the exchanger frame 14 and exchanger gasket 12 to the heat exchanger mount 7. The entire rear of the solar collector is thermally insulated from the environment by pan insulation 21 and heat exchanger insulation 22. These are protected from environmental exposure by the pan rearcoat 23 and H.E. (heat exchanger) rearcoat 24 which may also be thermally insulating and may be fire resistant to serve as a flame barrier when the solar collector is installed on an occupied structure such as a house. A pan frame 20 encompasses the perimeter of the solar collector to serve as a structural member, as an attachment member for the solar collector installation, and as a thermal insulator.

With reference to FIG. 3, the collector pan 6 is the prime component about which the solar collector assembly is constructed. In this preferred embodiment, the collector pan 6 is a plastic composite fabricated of plastic resin, fiberous reinforcement, fillers, and additives in combination. These are processed in conjunction with a mold to produce an essentially rigid and impermeable plastic laminate structure so configured by the mold to produce the various channels, surfaces, and spacers required for the proper routing of the collector fluid 5 in the assembled collector. A thermoset type plastic resin compound of the epoxy or polyester species is utilized with glass fiber reinforcement to produce the collector pan 6 of nominal thickness, in the range of 1/16 inch to 3/16 inch. Such fabrication is expected to provide desirable properties of high tensile strength, high resistance to heat, good chemical resistance, moderately low thermal conductivity, and moderately low density. The fabrication is not limited to these materials or thicknesses for the purpose of this invention. Other thermoset and many thermoplastic type resins with reinforcement can exhibit tensile strengths generally greater than 4000 psi and continuous heat ratings generally greater than 200° Fahrenheit. Many structural foam plastics can also provide these desirable properties. It is considered that fillers may be utilized, in particular, hollow glass sphere filler may be utilized to reduce both the density and the thermal conductivity of the laminate. It is considered that additives may be utilized for improvements such as flame retardancy, ultraviolet protection, reinforcement bonding, and color. A resin rich gel-coat may be utilized in the laminate, and this gel-coat may contain fillers and pigments to function all or in part as the radiation absorber 2.

The heat exchanger mount 7 is made an inseparable part with the collection pan 6. The mount 7 may be positioned as a step of the fabrication of the collector pan 6 so as to fuse during the resin cure cycle, or it may be adhesively attached after curing is complete, but the assembly must be hermetically sealed. The heat exchanger mount 7 is fabricated by the molding or casting of materials similar to the materials used in the collector pan 6. In this preferred embodiment, the exchanger mount 7 is a casting of epoxy or polyester resin compound reinforced with glass fiber and may contain a filler. The exchanger mount 7 is intended to function in the solar collector assembly for accurate positioning of the heat exchanger bundle 13 in the previously described loopwise continuity and, consequently, need to be positioned within 0.040 inches accuracy in lateral and in thickness relationship with the collector pan 6.

The collector pan 6 is molded to a configuration such that, when assembled with the downcomer insert 8, downcomer insulation 9, and a face insert 10, the assembly forms a shallow pan; i.e., the face pan 1, of nominal 48 inch by 48 inch lateral dimensions and ⅛ inch or less in depth. Behind the face pan 1, an internal and interconnecting series of channels are formed. These channels connect at top and at bottom through the pan port openings 30 in the face insert 10 to the frontward face of the face pan 1. Specific assembly for the face pan 1 and interconnecting channels occurs when the downcomer insert 8 is adhesively sealed to a mating configuration in the collector pan 6. By reason of the design of the insert 8 to be of lesser thickness than the depth of the mating configuration in the collector pan 6, an open channel 40 of somewhat rectangular cross section if formed top to bottom along the extent of the downcomer insert 8. The uppermost part of this channel is of greater width and, in conjunction with the heat exchanger mount 7, forms a chamber into which the heat exchanger bundle 13 is subsequently placed. The frontward configuration along the extent of the downcomer insert 8, at this point in the assembly, is a closed end trough of ¼ inch or greater depth and is filled to flush with the top by downcomer insulation 9. This downcomer insulation is formed of material such as a high temperature rated isocyuranate foam, to thermally isolate the interconnecting channels from the face pan 1.

The face insert 10 is next adhesively sealed to a mating configuration in the collector pan 6 to effect a continuum of front surface in the face pan 1 as formed by the face insert 10 and the collector pan 6 and so complete the assembly. In the fabrication of the face insert 10, a plurality of shallow cut-outs are made along the top edge and along the bottom edge, and when the face insert 10 is adhesively sealed to the collector pan 6, the material between the cut-outs is sealed to mating steps in the collector pan 6 configuration to effect a plurality of slit like pan ports 30. These pan port openings along the top and bottom of the face pan 1 connect to the rearward interconnecting channels.

The rear surface of the face insert 10 extending above the top of the downcomer insert 8 in conjunction with the convolution along the top portion of the collector pan 6 forms an open channel upper reservoir 31 extending the width and along the top of the assembly. This upper reservoir 31 opens through the plurality of upper pan ports 30 to the space in front of the face pan 1. A similar construction is made along the bottom of the face insert 10 with the formation of a lower reservoir 34 extending the width and along the bottom of the assembly. Lower reservoir 34 is open through a plurality of lower pan ports 30 to the space in front of the face pan 1.

The upper reservoir 31 connects through a port 32 in the heat exchanger mount to the top-to-bottom channel formed behind the downcomer insert 8 and subsequently to the lower reservoir 34. The port 32 and a downcomer port 33 in the channel may be so constructed and sized to restrict the flow of a fluid passing therethrough and, consequently, act to regulate the flow rate of collector fluid 5 passing through the port 32 and the downcomer port 33 in the solar collector assembly. Materials used in the construction of the downcomer insert 8 and the face insert 10 are essentially the same as those used for the collector pan 6. For convenience and economy of fabrication, the face insert 10 may be fabricated in three parts as indicated by the dotted separation lines in FIG. 3.

With reference to FIG. 1 and FIG. 2, the face pan 1 formed by the assembly of the face insert 10 into the collector pan 6 is so configured as to provide a regular arrangement of projecting cover spacers 37 and a regular arrangement of mixing promoters 38 over the entire forward facing surface of the face pan 1. This surface, in the preferred embodiment, also contains the radiation absorber 2 by virtue of the materials used in the construction of the surface or by virtue of an additional lamination or coating. Such radiation absorber 2 need exhibit an absorptivity of not less than 0.80 in the solar spectrum. The radiation absorber may also be constructed as a selective surface wherein its emissivity is desirably less than 0.50 in the infra-red spectrum for wavelengths in the range of 7.5 to 10.0 microns.

The cover spacers 37 act, in the operating assembly of the solar collector, as rests or stops which the face cover 4 may contact as it distorts inward under the influence of lesser interior pressure than the external atmospheric pressure. Such constraint in the deflection of the face cover 4 effects a general uniformity of thickness throughout the enclosure formed between the face cover 4 and the face pan 1. This constraint also effects a control over the tensile stress to be allowed in the face cover 4 material. In the preferred embodiment, the cover spacers 37 are located on approximately 2 inch centers over the surface of the face pan 1, and each cover spacer 37 provides an 0.010 or less square inch contact area with the face cover 4. The regular arrangement of mixing promoters 38 may be included in the configuration of the face pan 1 to effect local variations in the flow velocity of the collector fluid 5. The grid of mixing promoters 38 effects a regular pattern of weirs and wells to fluid flowing through the grid and thus effects a corresponding regular pattern of fluid velocity increases and decreases relative to the average velocity of fluid flow. A degree of fluid mixing is induced by such perturbations in the fluid velocity with such mixing intended to improve thermal homogeneity across the width of the fluid sheet as it flows upward.

A raised peripheral portion on the collector pan 6 forms a cover seat 39 to which the face gasket 11 and the face cover 4 are assembled to produce a hermetic seal between the face cover 4 and the collector pan 6. The cover seat and face gasket space the undistorted face cover 4 within ¼ inch of the cover spacers 37. Face gasket 11 is an elastomeric material of ¼ inch or less thickness and is adhesively bonded to the face cover 4 and to the cover seat 39. The face gasket extends in loopwise continuity around the entire periphery of the cover seat 39. In this preferred embodiment of the solar collector, face gasket 11 is a polyurethane elastomer in the range of 20 to 100 Shore D hardness and is bonded to the face cover 4 and to the cover seat 39 by an epoxy or polyester based adhesive to effect an overall elastic and hermetic seal. It is the objective in this assembly to achieve a highly durable hermetic seal of the face cover 4 to the collector pan 6 so as to withstand the mechanical, the chemical, and the thermal stresses imposed on the seal in the operating environment of the solar collector. Any bonding material or method that achieves the objective is considered within the context of this invention.

The face cover 4 is a thin and solar transparent plastic material or combination of materials. It is thin in the context that stress levels up to 60% of the material tensile rating may be considered permissible in the operating environment of the solar collector. It is solar transparent in the context of exhibiting greater than 70% transmissibility over the solar spectrum. The face cover 4 used in this preferred embodiment is an epoxy or polyester composite laminate incorporating transparent resins and glass fiber reinforcement and is 3/16 inch or less in thickness. The composite laminate may further include: surfacing films and coatings for improved optical and chemical properties, combination resins such as methacrylates and silicones, and additives to achieve improved properties for ultraviolet protection and reinforcement bonding. Other transparent resins are within the scope of this invention and include but are not limited to, acrylics, polycarbonates, polyethylene terephthalate, and silicones. It is considered in the scope of this invention that the optical transmissibility of a transparent material can be improved by surfacing the material with another material of lower index of refraction; i.e. laminated films of silicone or fluorine polymers or coatings of metallic fluorides can achieve this purpose.

The window assembly 3 contributes to the optical and the thermal performance of the solar collector and also provides weather protection of the interior structure. The preferred embodiment of the invention utilizes a dual pane window assembly consisting of the window frame 3a supporting the outer window 3b and the inner window 3c. The outer window 3b is an epoxy or polyester composite laminate incorporating transparent resins and glass fiber reinforcement and is ⅛ inch or less in thickness. All prior description and specifications given for the face cover 4 are appropriate also for the outer window 3b. In addition, the outer window 3b may be configured on the frontward surface to provide an esthetic pleasing appearance; may be configured on the rearward surface with the stiffeners to increase the bending moment of inertia; and may be configured on the rearward surface with a dimensional pattern to reduce convective heat transfer from the enclosed gas to the window material.

The inner window 3c in the preferred embodiment is a polyvinyl fluoride plastic film in the thickness range of 0.0005 to 0.004 inches. Such material exhibits a high tensile strength rating, a low optical index of refraction, good weatherability and high solar transmissibility. Other materials having similar capabilities are considered within the scope of this invention. The inner window 3c need exhibit the additional capability of being optically opaque in the infra-red spectrum wherein the collector system energy losses through radiation are to be minimized. Such spectrum is derived from the Wein displacement law for the operating temperature range of the solar collector; for reference, such infra-red region may be described by the wavelength boundaries of 7.5 and 10.0 microns; but, is not limited to these boundaries.

The window frame 3a is a structural plastic foam molding or casting of epoxy or polyester resin compounds reinforced with glass fiber and incorporating a hollow glass sphere filler material. It must exhibit the properties of: adequate strength, low thermal conductivity, and good weatherability. The windows 3b and 3c are mounted into the window frame 3a by any means which will assure a weathertight and impermeable seal. The enclosure formed by window frame 3a, outer window 3b, inner window 3c, and face cover 4 may be filled by atmospheric air or may be filled by a lower thermal conductivity gas such as carbon dioxide or sulfur dioxide. Window vents 35 are made through the frame 3a and through the inner window 3c to provide for pressure equalization of the gasses within the enclosures to the exterior atmospheric pressure. In the event that a gas other than exterior air is contained within the enclosures, the pressure equalization membrane 29 is sealed to the bottom interior rail of the window frame 3a and over the window vent 35 to provide a flexible physical barrier between the interior gasses and exterior air.

The pan frame 20 is a structural foam molding or casting of epoxy or polyester resin compounds reinforced with glass fiber and incorporating a hollow glass sphere filler material. This filler material provides a reduction in the density and in the thermal conductivity of the fabrication without significant loss in structural strength. The pan frame 20 has a nominal 48 inch by 48 inch outside lateral dimension and is 3 inches in depth plus an additional ⅜ inch riser on the outer periphery. A plurality of guide holes 36 are made along the riser and through the frame — front to rear — in the left and in the right rails of the frame. These holes constitute lead holes for nail or screw installation of the frame, and consequently, the solar collector, to a supporting structure such as the roof of a house. Additional guide holes 36 are made in the top rail at the center on the riser, at 8 inches left of center, and at 8 inches right of center to serve for attachment to a support structure which may be on either 16 inch or 24 inch centers. A similar set of three guide holes 36 are made in the bottom rail.

A plurality of frame inserts 26 are made integral with the pan frame 20 and along the riser in each of the four rails. These inserts provide means for mechanical attachment of the window frame 3a via attachments 28 to the pan frame 20. Such attachment also acts to compress the face gasket 11 in the assembly. For convenience of fabrication, the pan frame 20 may be fabricated in four rail sections.

With reference to FIG. 3, the heat exchanger portion of the solar collector is a demountable sub-assembly in this preferred embodiment and consists of the exchanger bundle 13 inseparably attached to the exchanger cover 15 which in turn is inseparably attached to the exchanger frame 14. This sub-assembly is assembled to the exchanger mount 7 using a plurality of exchanger attachments 27 in conjunction with mating exchanger inserts 25 which are an integral part of the exchanger mount 7. Exchanger gasket 12 is compressed in the assembly to effect a hermetic seal of the heat exchanger bundle 13 into the exchanger mount 7. With reference to FIG. 1, the exchanger bundle 13 fits in close juxtaposition to the downcomer insert 8 and to the exchanger cover 15 with such clearance not to exceed 0.063 inches. The exchanger bundle 13 also fits in close juxtaposition at the left side and at the right side to the interior walls of the exchanger mount 7 with such clearance not to exceed 0.040 inches. The exchanger bundle 13 is fabricated of four thin wall copper tubes of 3/16 inch outer diameter. Each tube is bent in serpentine manner with all straight runs parallel. The four serpentine tubes are spaced approximately 0.050 inch by interleaved shim strips running top to bottom along the 180° bends at the left and at the right, and the whole is brazed into an inseparable assembly. The four tube ends at the top are brazed into the exchanger outlet manifold 17 which is closed on the interior end and at the bottom are brazed into the exchanger inlet manifold 16 which is closed on the interior end. These manifolds pass through and are selaed to the exchanger cover 15 to provide support and positioning of the exchanger bundle 13 in the solar collection assembly. The exchanger frame 14 is made in the same manner and of the same materials as the exchanger mount 7. The exchanger cover 15 is made in the same manner and of the same materials as the collector pane 6.

The entire rear of the solar collector assembly is thermally insulated from the environment. The collector pan 6 is thermally insulated on the rear face by the pan insulation 21 which, in the preferred embodiment, it a high temperature rated isocyuranate foam applied by spray or poured to a nominal thickness of ½ inch or greater over the entire rear of the collector pan 6 and brought approximately flush with the heat exchanger mount 7. The heat exchanger insulation 22 is of the same material of ½ inch or greater thickness and is formed as a demountable plug to fit over the heat exchanger cover 15 and exchanger frame 14 to make thermal contact with the pan insulation 21 in the solar collector assembly. The pan rearcoat 23 and the H.E. rearcoat 24 are a non-combustible cellulose material in the preferred embodiment and are applied by spray or trowel to a ½ inch or greater thickness over the pan insulation 21 and the exchanger insulation 22. The combined properties for the foam insulation and the cellulose material rearcoat need be sufficient to transmit not more than 400 BTU's of heat energy per hour from the 16 square foot area of the surface when the internal collector fluid temperature is 100° Fahrenheit above the outer air temperature in contact with the rearcoat. The demountable feature of the exchanger insulation 22 coated with H.E. rearcoat 24 provides for maintenance access to the heat exchanger sub-assembly in the event repair or replacement is required.

In order for the solar collector to become operational, it need by charged with the collector fluid 5 which, in the preferred embodiment, is a liquid and might be any free flowing liquid in the temperature range of 100° to 180° Fahrenheit. In the practical sense, the liquid need also exhibit low cost, non-flammability, low toxicity, low freezing point, high boiling point, and chemical compatibility with the materials of the collector assembly. Among others, low viscosity silicone fluids and certain hydraulic system fluids are suitable liquids to fill the nominal 1½ gallon fluid volume of the solar collector assembly. The preferred embodiment of the solar collector is filled with an aqueous solution containing a freezing point depressant and a high temperature restricting means. Specifically, the preferred embodiment is filled with an aqueous solution containing ehtylene glycol, calcium chloride plus a selective concentration of an ethylene oxide polymer. Such liquid exhibits a reduction in freezing point to near zero degrees Fahrenheit and a high temperature precipitation point of the polymer adjustable to 180° Fahrenheit or lower. The precipitant cloud at the high temperature point acts to reflect a portion of the solar illumination and, in consequence, to reduce the illumination reaching the solar absorber surface. In the normal operation of the solar collector, external fluid is passed through the heat exchanger for heat transfer at a temperature generally less than 170° Fahrenheit. Should the external fluid flow be stopped, the liquid collector fluid 5 temperature will increase as bounded only by the solar illumination being absorbed and the normal thermal losses of the collector and boiling can occur unless some preventive means is taken. Inducement of the precipitant cloud is one such means and is self-triggering at a predetermined set-point temperature. It is also reversible in that the precipitant goes back into solution below the set point temperature.

It is considered, however, that in other embodiments controlled boiling of the collector fluid 5 with subsequent condensation by the heat exchanger bundle 13 may be encouraged to utilize the heat of vaporization of the collector fluid 5 in withdrawing heat from the solar absorbers.

In order to fill the solar collector with the liquid collector fluid 5, a means for producing a sub-atmospheric pressure is connected to a collector exhaust 19. A collector inlet 18 is connected to an open vessel containing the collector fluid 5 which is deareated and heated to about 140° Fahrenheit. With the collector assembly upright, collector fluid 5 is then drawn to totally fill the solar collector and, when full, the level of liquid in the vessel is adjusted to about two inches below the collector inlet 18. Collector exhaust 19 and collector inlet 18 are then crimped closed, sealed, and thermally insulated. Body pressure in the collector fluid 5 at the bottom of the collector is slightly less than atmospheric while body pressure at the top of the assembly is additionally less by an amount equal to the hydraulic pressure head of the vertical fluid continuum; i.e., 1.7 psi corresponding to the 48 inch height of the collector.

In the filled collector, face cover 4 is acted upon by a uniform external atmospheric pressure and by a linearly variable internal pressure. The largest pressure differential is inward at the top of the solar collector. Starting from the top, the semi-rigid or flexible face cover 4 deflects inward until stopped by the cover spacers 37. Such action propogates downward and outward from the central line until, by virtue of the design parameters, most of the area of the face cover 4 is in contact with the cover spacers 37. A generally uniform thickness of collector fluid 5 is so effected over the face pan 1 in the solar collector assembly.

It is generally understood that fluids contract in volume from cooling. Considering a water collector fluid 5, in cooling from 140° to 40° Fahrenheit, the volumetric contraction is 1.7% of the initial volume. Also considering that the face cover 4 and the face gasket 11 are made the compliant elements of the collector assembly, the internal body pressure of the collector fluid 5 should be essentially the same over the cooling process. Consequently, it may be considered that a 1.7% volumetric contraction occurs in the 1.5 gallon volume and that the differential volume is made up by additional inward deflection over the 16 square foot area of the face cover 4. The consequential mean inward deflection is 0.0026 inches without regard for cover spacers 37; local deflections are significantly greater, with regard taken for the cover spaces 37, but, are within the capabilities of the face cover 4 and the face gasket 11.

In normal operation, this Fluid Sheet Solar Collector is installed in a generally south facing direction and at an inclination from the horizontal in the range of 20° to 90°. External connections are made to the exchanger inlet 16 and the exchanger outlet 17 to provide the ficility for external fluid flow through the heat exchanger bundle 13. Solar illumination passes through the window 3, the face cover 4, and the collector fluid 5 to strike the solar absorber 2 wherein the absorbed radiant energy is transformed into heating of the absorber 2 and, consequently, into heating of the collector fluid 5 which is in close thermal contact over the entire surface of the absorber 2. Consider the collector fluid 5 in contact with the absorber 2 to be flowing upward along stream-lines which are constituted as closed loops. These loops pass bottom-to-top in the frontward portion over the face pan 1 and pass top to bottom in the rearward portion described by the channel formed between the downcomer insert 8 and the collector pan 6. The loops are all interconnected by flow reservoirs 31 and 34 and by flow ports 30, 32 and 33. An element of collector fluid 5 arrives at the top along a stream-line at higher temperature and at lower density than when it entered at the bottom. First considering that no external fluid is passing through the heat exchanger bundle, the element makes the downward trip along the stream-line and through an adiabatic enclosure at constant temperature and density; each successive cycle through the loop is at higher temperature and at lower density. Since the net density of collector fluid 5 in the frontward portion is less than that in the rearward portion, a differential hydraulic head is developed which effects a self-sustaining fluid circulation. Once the collector fluid 5 reaches a preselected operating temperature, external fluid is directed through the heat exchanger bundle 13 in such manner to maintain a rather constant temperature of collector fluid 5 entering the heat exchanger bundle 13; i.e., such manner to extract heat from the collector fluid 5 to the external fluid at the same rate that heat is being gained from the solar absorber 2.

A preferred embodiment of the invention having thus been described, it is considered that other embodiments are readily apparent. The invention is not restricted to a liquid-to-liquid heat transfer nor is the placement of the solar absorber restricted to the face pan nor even is the configuration restricted to a set of flat planes. Liquid-to-gas and gas-to-gas heat transfer arrangements are within the scope of the invention through apparent rearrangement and restructure of the heat exchanger device. The solar absorber can readily be placed on the face cover or within the collector fluid itself in the scope and context of the invention for the solar collector fluid and absorber to be in thermal contact throughout. The windows, face cover, face pan, and collector pan together may be bowed or bent or otherwise shaped for improved refraction inward of early morning and late afternoon solar radiation and yet retain proper relationships within the scope of the invention.

I claim:

1. A solar energy transformation device for converting solar spectrum radiation to fluid mass heat content by means of an efficient solar spectrum absorber in or on a base material which is not necessarily flat configuration and is not necessarily of high thermal conductivity but is necessarily in intimate thermal contact over its entire surface with a thin collector fluid sheet of ⅜ inch or less average thickness, means for retaining such fluid in sheet form between two material surfaces, one of which may contain the solar spectrum absorber, under the combined actions of body stresses in the materials and of reduced fluid body pressure with respect to ambient pressure such to achieve net compressive and shear stresses in the juncture of the two materials at their edges, means for connecting the collector fluid sheet at top and at bottom through a channel structure to provide continuity of the fluid mass throughout the sheet and the channel structure and to provide facility for fluid mass circulation loopwise throughout the sheet and channel configuration under the thermodynamic influence of fluid material heating in contact with the solar absorber material and/or fluid material cooling in the channel structure, either to produce a net lesser mean density of fluid in the sheet than in the channel at a characteristic vertical elevation, and consequently to effect an upward flow of fluid in the sheet with a corresponding downward flow of fluid in the channel structure, means for incorporating a heat exchanger element in the upper portion of the channel structure, and means for effecting thermal isolation between the fluid sheet and the fluid channel flow patterns and for thermal isolation of the sheet and of the channel from the ambient environment.

2. The device set forth in claim 1 wherein the outer material retaining the fluid sheet and first exposed to incident solar radiation is optically transparent or translucent to the solar spectrum for effecient transmission of the radiation into the fluid sheet and onto the interior retainer material which contains or is coated with an efficient radiation absorber.

3. The device set forth in claim 1 wherein the outer material retaining the fluid sheet and first exposed to incident solar radiation is optically opaque to the solar spectrum by virtue of the material properties or by virtue of a coating or combination of coatings which act as an efficient solar spectrum absorber and may also act to effect spectral filtering or to effect low emissivity of the infra-red spectrum or to effect protection of the absorber, means to apply coatings in selected thicknesses by vacuum deposition, plating, or other effective manner.

4. The device set forth in claim 1 wherein the outer material retaining the fluid sheet and first exposed to incident solar radiation is optically transparent or translucent to the solar spectrum for efficient transmisstion of the radiation into the fluid sheet and such fluid sheet contains dyes and/or particulate matter which act as efficient absorbers of solar spectrum radiation.

5. The device set forth in claim 1 wherein either or both of the materials which retain the collector fluid in sheet configuration are of plastic material suitable for the thermal, mechanical, and optical requirements of the device, as are the thermoset class of plastic resins, and are used alone or in combination with other materials, fillers, and reinforcements.

6. The device set forth in claim 1 wherein said heat exchanger provides physical separation of an external liquid from all other elements of the solar collector and is so arranged to provide a high degree of thermal contact of the collector fluid with the external liquid in flow through the heat exchanger and thereby acting to cool that collector fluid in thermal contact with the heat exchanger.

7. The device set forth in claim 1 wherein said heat exchanger provides physical separation of an external gas from all other elements of the solar collector and is so arranged to provide a high degree of thermal contact of the collector fluid with the external gas in flow through the heat exchanger-and such extended surfaces as appropriate to good thermal transfer — and thereby acting to cool that collector fluid in thermal contact with the heat exchanger.

8. The device set forth in claim 1 wherein said heat exchanger provides physical separation of an external fluid from all other elements of the solar collector and wherein the external fluid and/or the collector fluid may undergo a reversible change of state between liquid and gas phases; i.e., boiling and condensation, and wherein said heat exchanger exhibits appropriate surface configuration to cool the collector fluid in thermal contact with the heat exchanger.

* * * * *